United States Patent
Lawrence

[11] Patent Number: 5,903,236
[45] Date of Patent: May 11, 1999

[54] REFERENCE CARRIER PHASE PREDICTION FOR KINEMATIC GPS

[75] Inventor: David G. Lawrence, Mountain View, Calif.

[73] Assignee: The Board of Trustees of the Leland Stanford Junior University, Stanford, Calif.

[21] Appl. No.: 08/869,623

[22] Filed: Jun. 5, 1997

Related U.S. Application Data

[60] Provisional application No. 60/019,156, Jun. 5, 1996.
[51] Int. Cl.$^6$ ....................................................... G01S 5/02
[52] U.S. Cl. ........................................... 342/357; 701/214
[58] Field of Search .................................. 342/357, 352; 701/214

[56] References Cited

U.S. PATENT DOCUMENTS

| | | | |
|---|---|---|---|
| 5,451,964 | 9/1995 | Babu | 342/357 |
| 5,548,293 | 8/1996 | Cohen | 342/357 |
| 5,587,716 | 12/1996 | Sheynblat | 342/357 |
| 5,600,329 | 2/1997 | Brenner | 342/357 |
| 5,602,741 | 2/1997 | Talbot et al. | 364/449.7 |
| 5,610,616 | 3/1997 | Vallot et al. | 342/357 |
| 5,731,787 | 3/1998 | Sheynblat | 342/357 |

*Primary Examiner*—Mark Hellner
*Attorney, Agent, or Firm*—Lumen Intellectual Property Services

[57] ABSTRACT

A differential carrier phase GPS navigational device comprises an integer estimator [32] adapted to estimate an integer that resolves an integer cycle ambiguity, a reference phase predictor [30] adapted to predict a present reference phase value from reference phase information received by a data link receiver [22], and a position calculator [28] for computing a present vehicle position from the estimated integer, the predicted present reference phase value, and GPS signals received at a vehicle GPS receiver [20]. The reference phase predictor [30] comprises electronic circuitry adapted to determine a polynomial function which fits the reference phase information, and to evaluate the polynomial function to determine the predicted reference phase value. Because the position calculator uses a reference phase value that is not delayed, the navigational device is able to provide a vehicle position that corresponds to the present time.

12 Claims, 4 Drawing Sheets

REFERENCE CARRIER PHASE PREDICTION FOR KINEMATIC GPS

This application claims priority from U.S. Provisional Patent Application No. 60/019,156 filed Jun. 5, 1996.

This invention was reduced to practice with support from the Federal Aviation Administration under contract number NAS8-36125. The U.S. Government has certain rights in the invention.

FIELD OF THE INVENTION

The present invention relates generally to techniques for navigation and vehicular control using the global positioning system (GPS). More particularly, it relates to techniques for improving the performance of differential carrier phase GPS systems.

BACKGROUND ART

Since the advent of the global positioning system (GPS), considerable research has gone into developing techniques for improving its performance. In particular, the technique of differential GPS (DGPS) is based on the fact that many errors in GPS measurements are relatively constant over short distances and can be eliminated by taking the difference between two nearby measurements. Consequently, DGPS provides improved position accuracy. For example, FIG. 1 shows a vehicle 12 located in the vicinity of a GPS reference station 14. A GPS signal measured by the GPS reference station can be transmitted to the vehicle where it is subtracted from a GPS signal measured by the vehicle to obtain a differential GPS signal with respect to a single satellite 16. Using several similar differential GPS signals from other satellites, together with the known location of the reference station, the vehicle navigational equipment can determine the vehicle location.

Traditional DGPS systems are based on the measurement of satellite pseudorandom noise clear acquisition (C/A) code signal phases. Although this approach can provide position determinations accurate to within a few meters, some navigational applications of GPS require accuracies on the centimeter scale. In addition, the integrity of this approach is also insufficient for some applications. For example, traditional DGPS does not meet all the specifications for a Category III (zero visibility) aircraft landing system.

One technique for improving the performance of traditional DGPS systems is called kinematic DGPS, or differential carrier phase GPS. Kinematic DGPS is based on carrier phase measurements rather than C/A code phase measurements. Because the GPS signal carrier has a wavelength of about 19 cm, these measurements provide a potential accuracy on the order of a centimeter. In order to use carrier phase measurements, however, it is necessary to accurately resolve the integer cycle ambiguity of the carrier signal. In many applications it is also necessary to resolve this ambiguity quickly.

An integrity beacon landing system (IBLS) developed by researchers at Stanford University resolves integer cycle ambiguities through the use of ground-based GPS transmitters called pseudolites 18. The pseudolites, which are placed beneath the final approach path of the aircraft 12, transmit low power GPS signals which define hemispherical bubbles through which the aircraft passes. As the aircraft passes through the bubbles, the geometry of the combined satellite/pseudolite constellation changes rapidly, which allows the integer cycle ambiguities from the satellites to be resolved with high accuracy and integrity. Once the ambiguities are resolved, centimeter level accuracy can be obtained, even after the aircraft exits the integrity beacon bubbles.

Although the IBLS system succeeds in providing integer cycle ambiguity resolution with high integrity and accuracy, it does not solve other problems inherent in all differential carrier phase GPS systems. In particular, it does not overcome the differential correction latency problem, that is, the delay between the time a measurement is taken by the GPS reference station 14 and the time the corresponding correction is received at the vehicle 12. The amount of the delay is determined by the data uplink frequency and by the time required for the link signal to travel from the reference station 14 to the vehicle 12. Because the delayed reference signal must be compared to a vehicle signal which was measured at the same time, the calculated vehicle position will correspond to a past vehicle position rather than the present vehicle position. Consequently, the latency introduces undesired uncertainty in the present vehicle position.

Conventional kinematic DGPS systems either tolerate the position uncertainties introduced by differential correction latency, or use inertial integration techniques to determine the present vehicle position from the calculated past position and additional inertial data. In many automated vehicular control applications, such as Category III landing systems, the latency introduces an intolerable degradation in control performance. Inertial integration techniques, on the other hand, have the disadvantage that they introduce considerable hardware and software complexity to the navigational system.

SUMMARY OF THE INVENTION

Accordingly, it is a primary object of the present invention to provide a technique to overcome the differential correction latency problem inherent in differential carrier phase GPS systems. It is a further object of the present invention to provide such a technique which is simple, fast, reliable, and does not require additional hardware. Other objects and advantages will become apparent from the following summary and description.

The above objects and advantages are attained by a differential carrier phase GPS navigational system comprising a plurality of GPS satellites, a vehicle equipped with a GPS navigational device, and a reference station equipped with a GPS receiver and a data link transmitter. The GPS receiver is adapted to receive GPS signals from the satellites and the data link transmitter is adapted to transmit reference signal information derived from the received GPS signals to the vehicle. The vehicle navigational device comprises a GPS receiver adapted to receive GPS signals from the satellites, and a data link receiver adapted to receive the phase information transmitted by the reference station. The navigational device further comprises an integer estimator adapted to estimate an integer that resolves an integer cycle ambiguity, a reference phase predictor adapted to predict a present reference phase value from the reference phase information received by the data link receiver, and a position calculator for computing a present vehicle position from the estimated integer, the predicted present reference phase value, and the GPS signals received at the vehicle GPS receiver. The reference phase predictor comprises electronic circuitry adapted to determine a polynomial function which fits the reference phase information, and to evaluate the polynomial function to determine the predicted reference phase value. Because the position calculator uses a reference phase value that is not delayed, the position calculator is able to provide a vehicle position that corresponds to the present time.

BRIEF DESCRIPTION OF THE DRAWING FIGURES

DETAILED DESCRIPTION

Although the following detailed description contains many specifics for the purposes of illustration, anyone of ordinary skill in the art will appreciate that many variations and alterations to the following details are within the scope of the invention. In particular, it should be emphasized that although the following description presents an embodiment of the invention in the context of an aircraft landing system, the invention has obvious application to any differential carrier phase GPS system. Accordingly, the following preferred embodiment of the invention is set forth without any loss of generality to, and without imposing limitations upon, the claimed invention.

Figure 1:
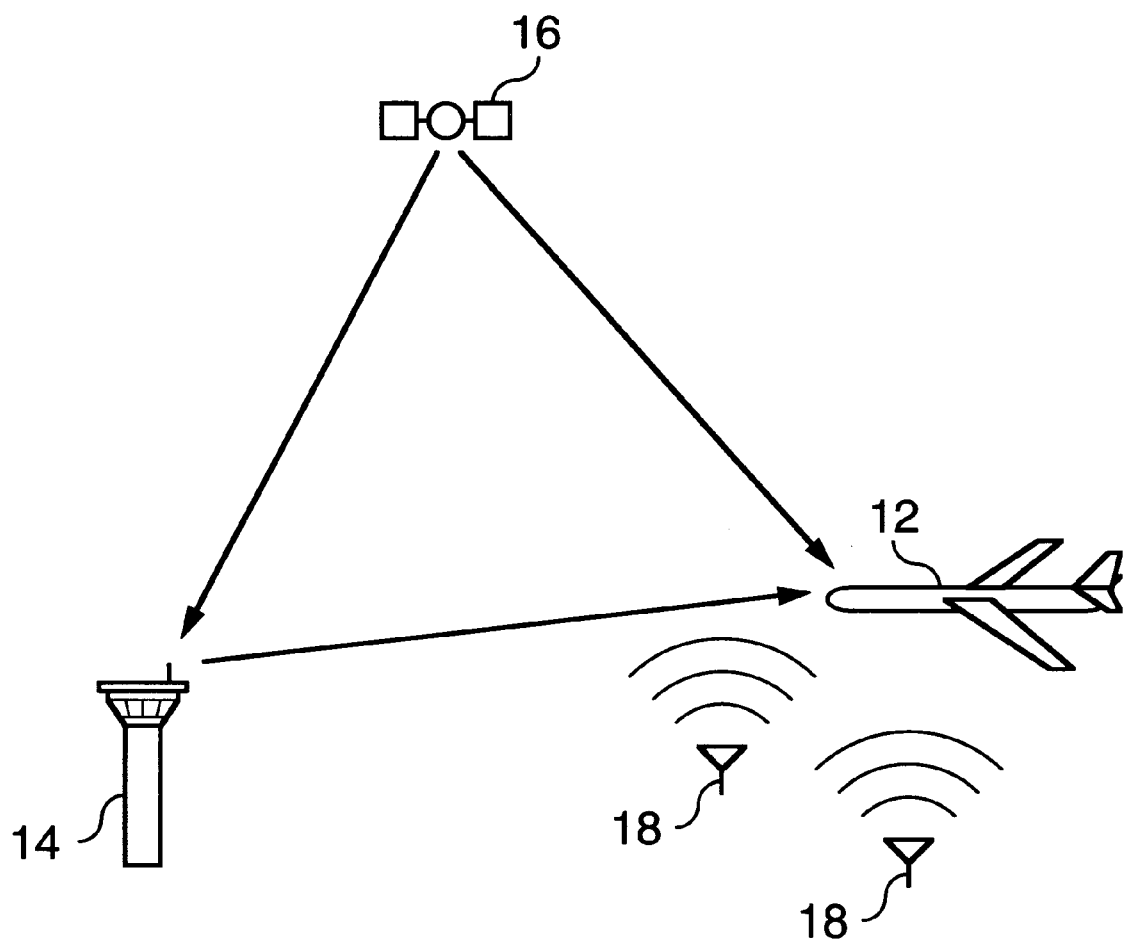
FIG. 1 illustrates a conventional kinematic GPS system.

A preferred embodiment of the invention comprises a kinematic GPS system that is similar to the conventional GPS system described in relation to FIG. 1, except for the architecture of the GPS navigational device onboard flight vehicle 12.

Figure 2:
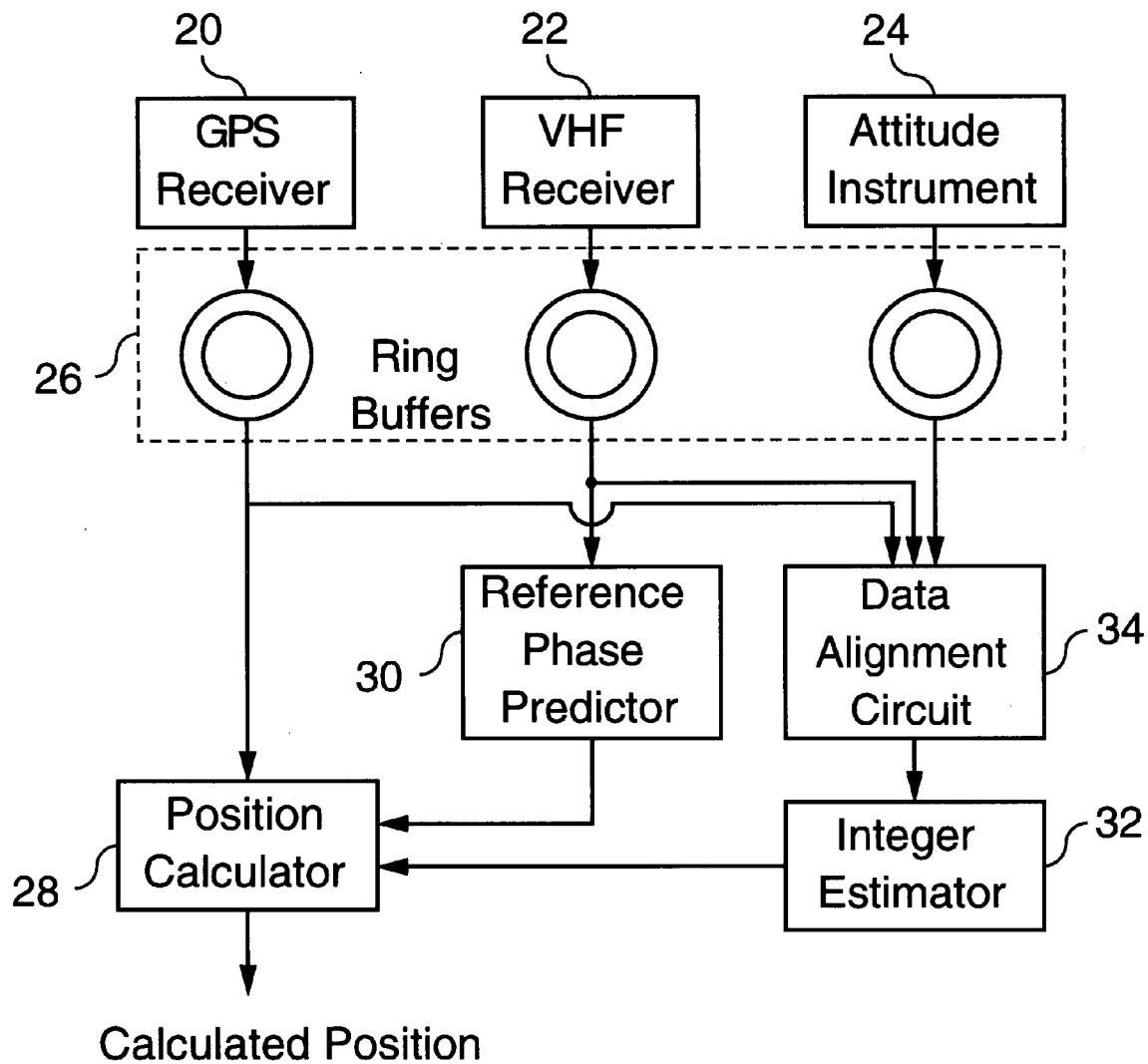
FIG. 2 is a block diagram of a GPS navigational device according to the present invention.

The GPS navigational device architecture used in the present embodiment is shown in FIG. 2. It comprises a conventional GPS receiver 20, a conventional VHF receiver 22, and a standard aircraft attitude instrument 24. GPS signals originating in a plurality of GPS satellites are received by GPS receiver 20 and stored in one of three ring buffers 26. The other two ring buffers are used to store GPS reference phase information received by VHF receiver 22 and aircraft attitude information generated by vehicle attitude instrument 24. Attitude information is required to account for the lever arm from the top GPS antenna to the pseudolite receive antenna. The information stored in buffers 26 is time-tagged.

A position calculator 28 is adapted to calculate a vehicle position based on the buffered signals and information from the GPS receiver 20, VHF receiver 22, and attitude instrument 24. Techniques for calculating a past vehicle position from a past vehicle GPS signal phase, a latest (delayed) reference phase, and an integer cycle estimate are well known in the art. In contrast to conventional GPS systems, however, the position calculator of the present embodiment is provided with a predicted present reference phase from a reference phase predictor 30. Accordingly, position calculator 28 is adapted to calculate a present vehicle position rather than a past vehicle position. In particular, position calculator 28 is provided with a present vehicle GPS signal phase from GPS receiver 20, a predicted present reference phase value from reference phase predictor 30, and an integer cycle estimate from an integer estimator 32.

Reference phase predictor 30 obtains past GPS reference phase information via VHF receiver 22 and uses this information to predict a present GPS reference phase. Similarly, integer estimator 32 receives information signals via a data alignment circuit 34 from GPS receiver 20, VHF receiver 22 and attitude instrument 24 and uses this information to determine a present integer cycle estimate. Data alignment circuit 34 serves to synchronize the three sources of data entering integer estimator 32, so that when a timetag is found that is common to all of the ring buffers, the synchronous data is used to improve the estimate of the integers.

Cycle ambiguity estimator 32 makes use of all available information to arrive at floating estimates of the integer biases associated with the GPS phase measurements. The uncertainty of these estimates is stored in a covariance matrix. The estimates are updated in several ways:

1) After each carrier phase measurement epoch, the satellite phase measurements are transformed to a reduced measurement set that is only a function of the integers. The position and clock error terms are eliminated from the measurement, thereby partitioning the estimation of the constant integers from the estimation of the changing position.

2) Code DGPS measurements are incorporated into the estimates, achieving an effect similar to carrier-smoothed-code.

3) Phase measurements from the Integrity Beacons (low-power pseudolite transmitters placed under the approach path) provide a high-accuracy, high integrity update to the estimator.

New satellites are added to the estimate and lost satellites are removed from the estimate with ease. Given redundant satellites, the estimator will converge toward the cycle ambiguities using satellite motion. With 7 satellites, the integer estimates typically converge to the cycle level in 15 minutes. During the pseudolite overpass, the estimates converge to the centimeter level in a matter of seconds. Receiver Autonomous Integrity Monitoring (RAIM) is performed during the pseudolite overpass to verify the consistency of the satellite and pseudolite measurements. Additionally, in all phases of flight RAIM is performed before each integer update to verify that the update is consistent with the existing integer estimates. Despite the flexibility of this architecture, it is straightforward to implement.

The present reference phase is predicted based on the history of the reference phase. Because the reference phase is relatively slowly changing (satellite motion and SA dominate the dynamics of the reference signal), it can be accurately predicted several seconds into the future (5 to 10 sec). The reference phase predictor performs this prediction in a simple yet robust manner. Although it is possible to predict more than several seconds in advance, a data latency or data dropout of that magnitude would most likely be unacceptable for the precision landing application. Therefore, the requirements for the predictor were derived to be:

1. Predict the reference phase several seconds with error on the order of centimeters.
2. Be robust to data dropouts.
b 3. Be easy to implement.
4. Predict phase at arbitrary timetags (i.e. not just at reference sample times).

Although many types of predictors may be used, a least-squares quadratic predictor was chosen for the preferred embodiment because it was simple, yet it performed quite well. A quadratic function of time is fit to the previous m reference phases (m>=3). More generally, the function used to fit the reference phases may be a polynomial function of time having arbitrary degree, or another function. Preferably, the function should be easy to compute and to fit to the reference phase data. The fit may be an exact fit to the data or it may be approximate. For example, a polynomial of degree m−1 can be fit exactly to m reference phases. A lower degree polynomial can be fit approximately to the m reference phases by selecting the polynomial having the least deviation from the m points in the least squares sense. Other methods of fitting and other types of functions may also be used.

Given the timetag of an aircraft receiver measurement, the calculated function is used to predict a corresponding reference phase. Naturally, it is preferred to use the most recent (i.e. "present") vehicle GPS receiver measurement and to predict a corresponding present reference phase so that the calculated vehicle position is close to the present position.

The performance of the predictor is given in Table 1. The table was generated by finding the difference between the predicted phase and the actual phase for different values of m and different data latencies. The data uplink frequency is 1 Hz. The predictor errors are quite acceptable for data latencies less than 5 seconds and m between five and eight. As expected, the prediction error starts increasing for larger values of m because older data is weighted the same as more recent data. A weighted least-squares predictor which decreased the weights with the age of the data may be used to improve performance slightly.

TABLE 1

Reference Phase Predictor Error Versus Data Latency and m.

| 1 σ Error (cm) | 1 sec | 2 sec | 3 sec | 5 sec | 10 sec |
|---|---|---|---|---|---|
| m = 3 | 1.09 | 2.58 | 4.68 | 10.74 | 36.70 |
| m = 4 | 0.75 | 1.53 | 2.55 | 5.57 | 18.50 |
| m = 5 | 0.63 | 1.12 | 1.82 | 3.86 | 13.08 |
| m = 6 | 0.56 | 0.95 | 1.52 | 3.24 | 11.32 |
| m = 7 | 0.55 | 0.93 | 1.47 | 3.15 | 11.14 |
| m = 8 | 0.56 | 0.95 | 1.52 | 3.24 | 11.43 |

The GPS sample rate for kinematic applications is typically 4 Hz to 20 Hz. The data uplink frequency is about 2 Hz. The predictor provides accurate phase prediction 5 to 10 sec. in advance, based on data about 7 sec. in the past.

To use the differential carrier phase to perform position solutions, an estimate of the integer cycle ambiguities is required. The carrier phase measurement equation can be written:

$$\phi = [G\ I]\begin{pmatrix} x \\ \tau \\ N \end{pmatrix} + \delta\phi \quad (1)$$

where $\phi$ (ns×1) is the single-difference carrier phase measurement (expressed in L1 wavelengths), G (ns×4) is the traditional GPS geometry matrix, I (ns×ns) is the identity matrix, x (3×1) is the position, τ (scalar) is the differential receiver clock bias, N (ns×1) are the integers, δϕ (ns×1) are the measurement errors (including reference phase prediction errors), and ns is the number of satellites.

If an integer estimate, $\hat{N}$, and the corresponding covariance, $P_N$, are available, this equation may be rewritten:

$$\phi - \hat{N} = G\begin{pmatrix} x \\ \tau \end{pmatrix} + (\tilde{N} + \delta\phi)$$

where $\tilde{N}$ is the error in the integer estimate. Assuming the measurement errors are uncorrelated with variance $\sigma^2$, a weighted least-squares position/clock estimate may be calculated:

$$\begin{pmatrix} \hat{x} \\ \hat{\tau} \end{pmatrix} = [G^T R_e^{-1} G]^{-1} G^T R_e^{-1}(\phi - \hat{N})$$

with covariance: $P_{x\tau} = [G^T R_e^{-1} G]^{-1}$,
where $R_e = \tau^2 I + P_N$.

It is therefore convenient to keep a running estimate of the integers. An integer estimator was developed with the following goals in mind:

Eliminate the need for mode switching from code to carrier differential GPS after the bubble pass.

Maintain an estimate and covariance of the integers.

Update estimates using all available information, including integrity beacon results.

Bring satellites on and off line gracefully as they are acquired and lost.

Allow for continuous RAIM.

Be easy to implement.

Implementing the estimator as described here, these primary goals are met, and the following advantages are also achieved:

Integer estimates converge from satellite motion.

Flexible architecture allows simple extensions described later.

When the program is first started, the integer estimates are initialized using the differential code phase measurements:

$$\phi_{code} = [G]\begin{pmatrix} x \\ \tau \end{pmatrix} + \delta\phi_{code}$$

$\phi - \phi_{code} = N + \delta\phi - \delta\phi_{code}$ $\hat{N} = \phi - \phi_{code}$ $P_N = (\sigma^2 + \sigma^2_{code})I = \sigma^2_{code}I$ where $\phi_{code}$ is the code phase expressed in L1 cycles.

After the integer estimates are initialized in this manner, they are refined from a variety of sources. It is important to note that only the aligned measurements from FIG. 2 are used to update the integer estimates (error in the reference phase predictor does not corrupt the estimates). In all cases, the estimate update is performed by casting the new information into the following form:

$z = HN + V$ $E[VV^T] = R.$ \quad (2)

Figure 3:
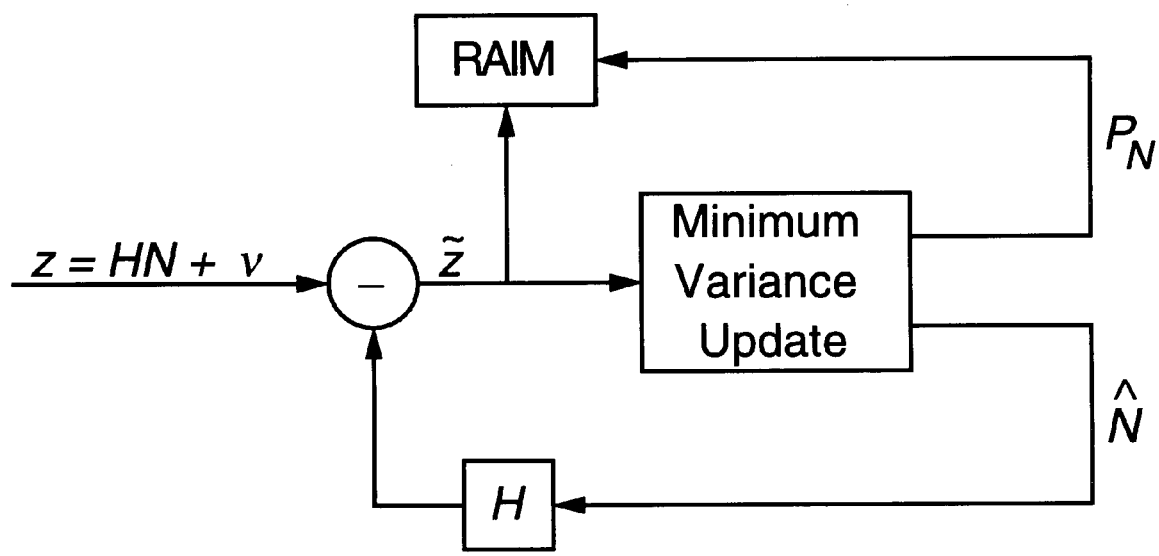
FIG. 3 is a block diagram illustrating a measurement update process according to the present invention.

In this form, the measurement is used in a minimum variance measurement update:

$K = P_N^- H^T [H P_N^- H^T + R]^{-1}$ $\hat{N}^+ = \hat{N}^- + K(z - H\hat{N}^-)$ $P_N^+ = [I - KH] P_N^-$ \quad (3)

where the '−' and '+' in the superscripts indicate before and after the measurement update. No process update is necessary, because the states being estimated are constants. The measurement update process is represented by the block diagram shown in FIG. 3.

If there are more than four satellites, each differential carrier phase measurement can be cast into the form of equation 2. Pre-multiplying equation 1 by L, where the rows of L make up an orthonormal basis for the left null space of G:

$$L\phi = LN + L\delta\phi \quad (4)$$

$$z = L\phi$$

$$H = L$$

$$R = \sigma^2 LL^T = \sigma^2 I.$$

This pre-multiplication by L eliminates the position and clock terms from the measurement equation and separates the integer estimation from the position estimation.

The code phase measurements can be used to update the integers by subtracting them from the carrier phase measurements. The resulting equation is already in the desired form:

$$\phi - \phi_{code} = N + \delta\phi - \delta\phi_{code}$$

$$z = \phi - \phi_{code}$$

$$H = I$$

$$R = (\sigma^2 + \sigma^2_{code})I$$

Updating the carrier phase cycle ambiguity estimates using code phase measurements is similar to carrier smoothed code. Both techniques make use of the advantages of each measurement. The carrier phase has low noise but an integer bias; the code phase has high noise but no bias. One technique uses code phase measurements smoothed by the carrier, while the other uses the carrier phase gravitated toward the code.

The rapid geometry change the occurs during an integrity beacon overpass provides another update to the integer estimator. The output of the integrity beacon processing software is a high accuracy estimate of the individual satellite integer differences along with the corresponding covariances. The integers themselves are unobservable, but only the integer differences affect the position solutions. Any common bias affects only the clock solution. The details of calculating the integer differences from the integrity beacon measurements are given below. As with the other integer updates, the new information can be written in the form of equation 2:

$$z = HN + v$$

$$H = \begin{bmatrix} -1 \\ \cdot \\ \cdot & I \\ \cdot \\ -1 \end{bmatrix}$$

The matrix H (ns−1×ns) reflects the fact that only integer differences are output; the integer of an arbitrary satellite is subtracted from all of the rest. The R used in the update equations is simply the integer difference covariance output by the integrity beacon processing code. R is a function of the overpass geometry.

Figure 4:
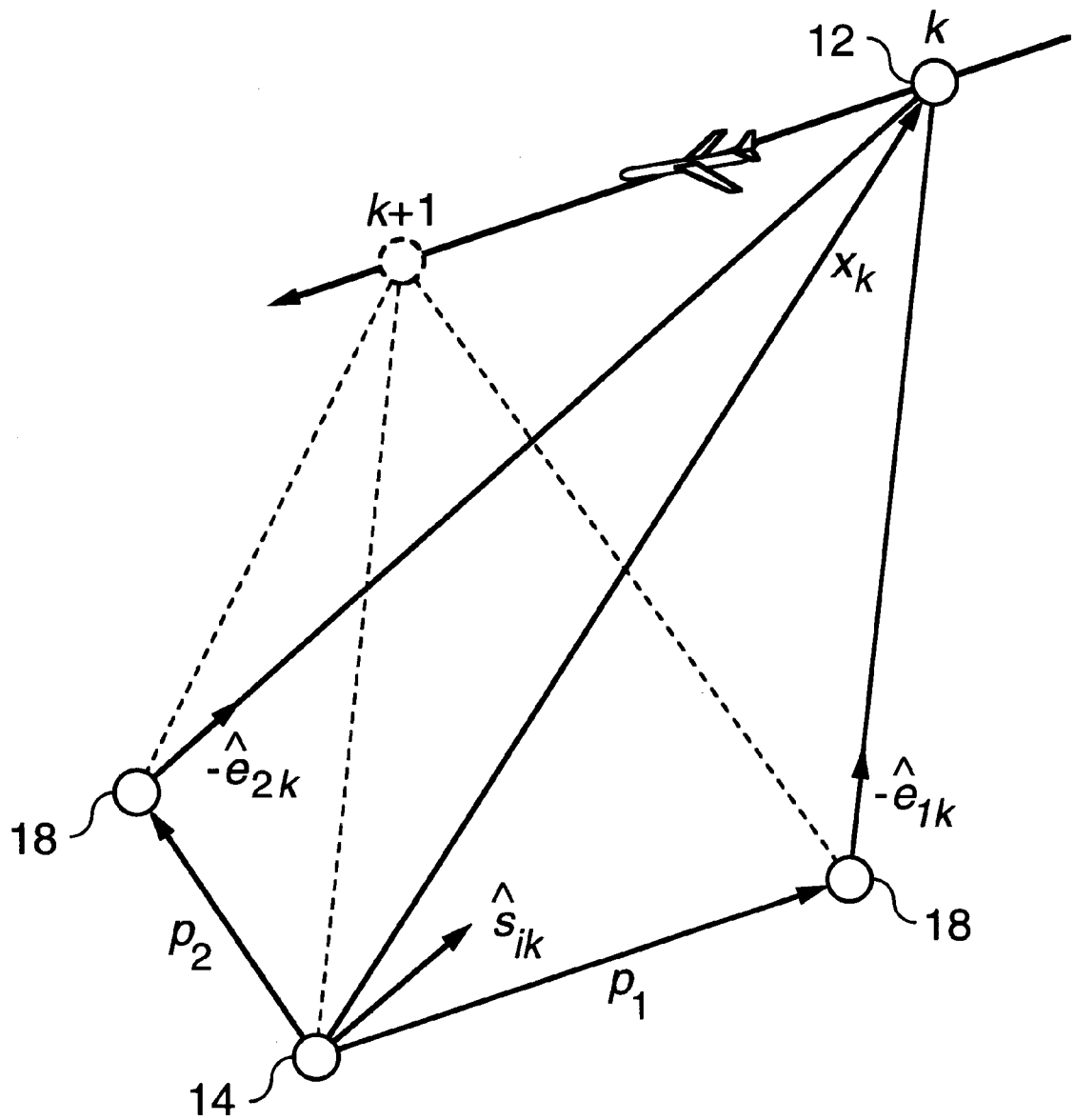
FIG. 4 illustrates the geometrical relationship between a vehicle, a reference station, and two integrity beacons, according to the present invention.

The geometry change that occurs as an aircraft flies over a pair of integrity beacons provides information similar to several hours of satellite motion in a matter of seconds. However, due to the nonlinear nature of this geometry change (G is a function of X for the integrity beacons), this information must be processed separately. Expanding the single difference carrier phase measurement equation for SV i at epoch k, we obtain $$\phi_{ik} = -\hat{s}_{ik}^T x_k + \tau_k + N_i^s + \epsilon_{ik}^s,$$

where $\phi_{ik}$ is the single-differenced phase, $\hat{s}_{ik}$ is the line-of-sight vector, $x_k$ is the displacement vector from the differential station to the aircraft (see FIG. 4), $\tau_k$ is the difference in the aircraft and reference receiver clock biases, $N_i^s$ is the integer cycle ambiguity, and $\epsilon_{ik}^s$ is the measurement error due to multipath and receiver noise. Similarly for pseudolite j at epoch k $$\phi_{jk} = |P_j - X_k| - |P_j| + \tau_k + N_j^p + \epsilon_{jk}^p$$

where $\phi_{jk}$ is the single-differenced phase and $p_j$ is the vector from the differential station to pseudolite j as shown in FIG. 4.

Given an approximate trajectory $\bar{x}_k$ obtained from code-based differential GPS, the equations above can be expressed in terms of the deviation from the approximate trajectory: $\epsilon x_k \equiv x_k - \bar{x}_k$. Keeping first order terms only, the result is $$\begin{aligned} \delta\phi_{ik} &\equiv \phi_{ik} + \hat{s}_{ik}^T \bar{x}_k = -\hat{s}_{ik}^T \delta x_k + \tau_k + N_i^s + \epsilon_{ik}^s \\ \delta\phi_{jk} &\equiv \varphi_{jk} - |p_j - \bar{x}_k| + |p_j| \\ &= -\hat{e}_{jk}^T \delta x_k + \tau_k + N_j^p + \epsilon_{jk}^p \end{aligned}$$

where $\hat{e}_{jk}^T \equiv (p_j - \bar{x}_k)/|p_j - \bar{x}_k|$. We now note that the value of one integer must be specified due to the existence of the clock bias $\tau_k$ which is common to all measurements at epoch k. For simplicity, we choose $N_1^s = 0$. Defining $\epsilon\Phi_k$ to be the vector of m SV and two pseudolite measurements at epoch k $$\delta\Phi \equiv \begin{bmatrix} \delta\phi_{1k} \\ \cdot \\ \cdot \\ \cdot \\ \delta\phi_{mk} \\ \delta\phi_{1k} \\ \delta\phi_{2k} \end{bmatrix}$$

and $\hat{S}_k$ as $$\hat{S}_k = \begin{bmatrix} \hat{s}_{1k}^T & 1 \\ \cdot & \cdot \\ \cdot & \cdot \\ \cdot & \cdot \\ \hat{s}_{mk}^T & 1 \\ \hat{e}_{1k}^T & 1 \\ \hat{e}_{2k}^T & 1 \end{bmatrix}$$

we stack all n measurements collected during pseudolite overpass to obtain $$\begin{bmatrix} \delta\Phi_1 \\ \cdot \\ \cdot \\ \cdot \\ \delta\Phi_k \\ \cdot \\ \cdot \\ \cdot \\ \delta\Phi_n \end{bmatrix} = \begin{bmatrix} \hat{S}_1 & & & & I \\ & \cdot & & 0 & \cdot \\ & & \cdot & & \cdot \\ & & & \hat{S}_k & & I \\ & & & & \cdot & \cdot \\ & 0 & & & \cdot \\ & & & & \hat{S}_n & I \end{bmatrix} \begin{bmatrix} \delta x_1^* \\ \cdot \\ \cdot \\ \delta x_N^* \\ \cdot \\ \cdot \\ \cdot \\ N^* \end{bmatrix} + \epsilon$$

where $\delta x_k^* \equiv [\delta x_k^T \tau_k]^T$, $N^* \equiv [N_2^s \ldots N_m^s N_1^p N_2^p]^T$, and $\epsilon$ is the measurement error.

The least-squares solution to the above can be obtained efficiently by sparse matrix batch algorithms or equivalently by sequential forward-backward smoothing. Due to nonlinear nature of the problem, the approximate trajectory and observation matrix is improved by the computed estimate of $\delta x_k$, and the process above is repeated through convergence. The residuals of this solution provide a high level of integrity. The result of this process is a high accuracy, high integrity estimate of the integer differences. This estimate is used to update the overall integer estimate.

As an aircraft banks, it may lose the signal from some satellites and acquire the signal from others. Satellites may also be acquired or lost as they pass the receiver elevation mask angle. It is therefore desirable to remove satellites and add satellites to the integer estimate. The covariance form of the estimator was chosen primarily because it makes this task quite simple. To remove a satellite, the corresponding state is removed. The element of the estimate and the row and column of the covariance are simply discarded. To bring a new satellite on-line, the integer is initialized using a the code phase measurement for that satellite:

$$\hat{N}^{new} = \phi^{new} - \phi^{new}_{code}.$$

The variance for the new integer is set consistent with the code phase measurement noise; the cross covariance for the other integer states is set to zero:

$$E[\tilde{N}^{new}\tilde{N}^{new}] = (\sigma^2 + \sigma^2_{code}),$$

$$E[\tilde{N}^{new}\tilde{N}^{old}] = 0.$$

After one carrier phase measurement update, the state estimate and covariance for the new satellite are consistent with the other integer estimates. This technique has proven to be an efficient method for handing-off satellite integer estimates.

RAIM is performed before each integer update to verify that the new measurement is consistent with the existing integer estimates. If the measurement does not pass this check, the approach can be aborted. In some cases, the failure may be isolated.

In preparation for an integer update, the new measurement is already in the form of equation 2. The difference between the expected measurement and the actual measurement is calculated:

$$r = E[z] - z = E[HN + v] - HN - v,$$

$$r = H(\hat{N} - N) - v = H\tilde{N} - v.$$

This residual quantity, r, is a random vector with zero mean and covariance given by: $P_r = HP_N H^T + R$.

A measure of the consistency of the new measurement is the weighted residual: $w = r^T P_r^{-1} r$, $w = r^T P_r^{-1} r$. If this weighted residual is greater than some predetermined threshold, a RAIM alert is issued. The threshold is a function of the dimension of r and the desired continuity.

The differences between the integers are observable in a dynamic environment because of satellite motion. A welcome side-effect of this airborne architecture is that the integer differences will tend to converge using satellite motion. This convergence results from the carrier phase measurement updates described earlier. Satellite motion is automatically taken into account each time there is a carrier phase measurement update, because the L matrix in equation 4 changes with time. Although the implementation of the carrier phase updates are performed sequentially, the observability analysis is shown below for a batch solution.

As the satellite geometry changes, the L matrix in equation 4 also changes. Grouping an arbitrary satellite integer with the clock bias term, equation 1 may be rewritten:

$$\phi = [G\ \bar{I}]\begin{pmatrix} x \\ \tau + N_1 \\ N_2 - N_1 \\ . \\ . \\ . \\ N_{ns} - N_1 \end{pmatrix} + \delta\phi$$

$$\bar{I} = \begin{bmatrix} 0\ldots 0 \\ I \end{bmatrix}.$$

Pre-multiplying by the left null space of G:

$$z = L\phi = L\bar{I}N' + L\delta\phi$$

$$N' \equiv \begin{pmatrix} N_2 - N_1 \\ . \\ . \\ . \\ N_{ns} - N_1 \end{pmatrix}.$$

Several of these measurements can be stacked together:

$$z_* \equiv \begin{pmatrix} z_1 \\ . \\ . \\ . \\ z_k \end{pmatrix} = L_*\bar{I}N' + \begin{pmatrix} L_1\delta\phi_1 \\ . \\ . \\ . \\ L_k\delta\phi_k \end{pmatrix} \quad (5)$$

where:

$$L_* \equiv \begin{bmatrix} L_1 \\ . \\ . \\ . \\ L_k \end{bmatrix}.$$

The reason that only integer differences are observable while the integers themselves are unobservable is that $L_*$ never has rank greater than (ns−1). The columns of L always sum to zero. Therefore, the sum of the columns of $L_*$ are also constrained to sum to zero, and the maximum rank is (ns−1). However, only integer differences are required to solve for position. Given sufficient geometry change and enough redundant satellites, the matrix $L_*\bar{I}$ will have rank (ns−1) and equation 5 may be used to estimate N':

$$\hat{N}' = [\bar{I}^T L_*^T L_* \bar{I}]^{-1} \bar{I}^T L_*^T z_*.$$

If the measurement samples are widely spaced enough in time, the noise will be uncorrelated and the estimate error covariance reduces to: $E[\tilde{N}'\tilde{N}'^T] = D\sigma^2$, $D = [\bar{I}^T L_*^T L_* \bar{I}]^{-1}$. The matrix D is similar to dilution of precision (DOP) The square root of the trace of D is analogous to PDOP and is referred to as NDOP. The quantity (NDOP×σ) approximates the one-sigma integer estimate error. A typical value of NDOP using seven or more satellites and two measurements separated by 15 minutes is 20. Assuming a carrier phase measurement error of 0.5 cm, the one-sigma integer estimate is typically 10 cm after 15 minutes of satellite motion. In contrast, NDOP for a 10 second integrity beacon overpass is about 2. The information provided by the integrity beacon far exceeds that provided by satellite motion. Nevertheless, satellite motion is a welcome complement to the integrity beacon overpass.

In the sequential implementation of the carrier phase measurement update, it is not necessary to group one satellite with the clock bias. Although only integer differences are observable from satellite motion, the integers themselves are initialized from code phase measurements. The implication is that one direction of the integer covariance will remain at its initial value (neglecting code phase measurement updates). Scaling problems could arise as the minimum eigenvalue decreases while the maximum eigenvalue remains the same. This issue does not present a practical limitation because adding a small amount of process noise to the covariance prevents the minimum eigenvalue from decreasing without bound.

For experimental purposes, it is often convenient to know the integers before the aircraft takes off. For this reason, a static survey mode may be added to the estimator. When the user changes to this mode, the estimator assumes the aircraft is not moving. This static constraint allows the estimator to converge faster and with fewer satellites. When the static constraint is imposed, the integer state is augmented with the position. Breaking the geometry matrix into the satellite line-of-sight matrix, $G_x$, and the column of ones that multiply the clock bias, equation 1 can be rewritten:

$$\phi = \begin{bmatrix} & & 1 \\ & & \cdot \\ G_x & \cdot & I \\ & & \cdot \\ & & 1 \end{bmatrix} \begin{pmatrix} x \\ \tau \\ N \end{pmatrix} + \delta\phi.$$

The clock bias is removed from this measurement by premultiplying by $L_\tau$, where $L_\tau \equiv (\text{null}[1 \ldots 1])^T$:

$$L_\tau \phi = [L_\tau G_x \ L_\tau] \begin{pmatrix} x \\ N \end{pmatrix} + L_\tau \delta\phi.$$

This is of the form of equation 2, but now the state contains both position and integers. As before, the state is updated using equations 3 with: $z = L_{96} \phi$, $H = [L_{96} \ G_x L_\tau]$, $R = \sigma^2 L_\tau L_\tau^T$.

Convergence in static mode is typically two or three times faster than dynamic mode. Integer estimates are often within a cycle of their true value in less than five minutes. Before the aircraft starts moving, position is simply discarded from the state estimate.

If the user knows the aircraft's position, this position can be incorporated into the integer estimate. In static mode, this update is straightforward. The position "measurement" can be written in the form of equation 2:

$$z = \hat{x} = H \begin{pmatrix} x \\ N \end{pmatrix} + \tilde{x},$$

where $H = [I \ 0]$.

The "measurement noise" is the uncertainty in the position. The user enters the position and a covariance matrix representing this uncertainty. An example of when this feature is useful is when the aircraft is parked at the tie-down location. Each time the aircraft is there, its vertical position is the same to within a few centimeters; the horizontal position may be different by a meter. This uncertainty can be accurately entered into the estimate. After leaving the tie-down, the vertical position error and covariance will remain small, while the horizontal error will slowly converge. This feature was used during a flight test discussed later.

This real-time system has been implemented and extensively tested. It was used to perform 49 autocoupled approaches of a single engine light aircraft, and was used to perform 110 automatic landings of a large commercial jet aircraft. The following sections describe experiments designed to exercise several aspects of the system.

The real-time system was set up and tested in the lab; the reference station and aircraft receivers were connected to separate antennas on the roof. To accentuate multi-path errors, ground planes were not used. Due to the antenna gain pattern and cable loss, satellites were not acquired until they reached an elevation angle of about fifteen degrees. The system was initialized and data was collected for 24 hours. The first goal of this experiment was to demonstrate the integer estimator convergence using satellite motion. Although the baseline was static, the static survey mode of the estimator was not used. The second goal was to smoothly hand-off integer estimates for 24 hours.

The magnitude of the 3-D position error over the 24 hour period has an initial error of about three meters (off the vertical scale of the plot). Using satellite motion, the position error converged to the cycle level in about fifteen minutes. In less than an hour, it converged to less than ten centimeters where it stayed for the remainder of the test. After the first hour, the mean value of the magnitude of the position error was 2.2 cm.

Twenty-five different satellites were used during the 24 hours. Some satellites were brought on and off line several times while their signal strength was low. Satellite integer estimates were brought on-line a total of 192 times. These hand-offs were performed seamlessly. After the estimator converged on the integers for one set of satellites, the position error remained small using entirely different sets of satellites. By the end of the test, the original satellites returned to their initial positions in the sky. The implication of this periodic geometry is that the satellites could be handed off indefinitely while retaining centimeter-level positioning accuracy.

To exercise the system in an airborne environment, a flight test was performed in a single engine light aircraft. In contrast to the static test discussed earlier, the true position of the aircraft in flight is not known exactly. However, if a separate process knows the correct values of the rounded integers, a centimeter-level truth trajectory can be found. This trajectory can be compared with the trajectory estimate calculated using the integer estimator and reference phase predictor to evaluate the system performance.

To find the integer differences for the truth trajectory, the static survey mode of the estimator was used while the aircraft was at the tie-down. In about fifteen minutes, the estimator converged to within a half-cycle of the correct integer differences. The integer difference were rounded to the correct values. The measurement residual was monitored for another fifteen minutes to verify that they were correct. The flight test was performed when the satellite geometry was such that six satellites could be continuously tracked, even when the aircraft banked. This ensured that the integer differences used for the truth trajectory were constant throughout the flight.

The real-time system was reset before the flight (the integer differences found from the static survey were only used to find the truth trajectory). The integers were initialized as usual, using differential code phase measurements. As mentioned earlier, the vertical position at the tie-down is well known. To demonstrate the "known position update" feature described earlier, this vertical information was incorporated into the estimate. After the position update, the vertical position was accurate to a few centimeters, while the horizontal position was wrong by several meters (as intended). During the flight, the horizontal position should converge toward the correct value, while the vertical position should remain accurate.

Six spacecraft were in view during the entire flight. However, to provide more of a challenge to the system, satellite outages were simulated in software. Every four minutes, one satellite was removed for a period of thirty seconds. During the 26 minute flight, each satellite was removed once. Therefore, each integer was taken off-line and brought back on-line.

The real-time system developed to demonstrate the Integrity Beacon Landing System was designed to be easy to implement yet provide the flexibility required of a research tool. Distinguishing features of this architecture include:

Only the L1 carrier and C/A code are used.

Kinematic position solutions are provided with minimal delay in all phases of flight. Integer estimates are continuously refined.

Several layers of RAIM provide high-integrity. The Integrity Beacon information is particularly powerful in this respect.

Cycle ambiguities are found without using integer searches.

Integer estimates are smoothly handed off as satellites are acquired and lost.

Additional information such as static constraints is easily incorporated into the system.

It will be appreciated by those skilled in the art that many alterations, substitutions, and/or modifications to the above specifics are within the scope of the invention. Moreover, it will also be appreciated that the present invention has a general applicability and is not limited to aircraft landing systems. For example, such an improved kinematic GPS system can be used to guide all phases of aircraft movement, including landing, roll-out, and taxi. It also has obvious applications to navigational systems in other vehicles. For example, such a system may be used for marine boat docking, automated farming, construction vehicles, and mining. It should also be noted that the present system may be used in a vehicle control system which has a human in control loop, and need not necessarily be fully automated.

I claim:

1. A navigational device comprising:
    a GPS receiver adapted to receive GPS signals from at least one GPS satellite;
    a data uplink receiver adapted to receive reference signal information from a GPS reference station;
    a reference phase predictor adapted to predict a present reference signal phase based on the received reference signal information;
    an integer estimator adapted to calculate integers that estimate the cycle ambiguities of the GPS signals; and
    a position calculator adapted to compute a present vehicle position based in part upon the estimated integers, the predicted reference signal phase, and the GPS signals;
    wherein the reference phase predictor is adapted to select a polynomial function of time that fits past reference phases derived from the received reference signal information, and to evaluate the polynomial function to determine the predicted present reference signal phase.

2. The device of claim 1 wherein the polynomial function is a quadratic function and wherein the quadratic function is selected to be a best fit, in the least squares sense, to the past reference phases.

3. In a differential carrier phase global positioning system, a computer implemented method for determining a present position of a vehicle, the method comprising:
    predicting from a collection of past GPS reference signals of a GPS reference station a present carrier phase of the reference station;
    determining from the past GPS reference signals and from GPS signals received at the vehicle, integers that estimate cycle ambiguities of the vehicle GPS signals; and
    calculating from the estimated integers, the predicted present reference signal phase, and the GPS signals a present vehicle positions
    wherein the predicting step comprises fitting a polynomial function to past carrier phases derived from the collection of past GPS reference signals and evaluating the function at a present time.

4. The method of claim 3 wherein the fitting step comprises selecting a quadratic polynomial function which is a best fit, in the least squares sense, to the past carrier phases.

5. A GPS navigational device for determining a position of a vehicle, the device comprising:
    a GPS receiver coupled to GPS signals originating from at least one GPS satellite and producing a present vehicle GPS carrier phase;
    a data uplink receiver coupled to GPS reference signals originating from a GPS reference station and producing a past GPS reference carrier phase, wherein the past GPS reference carrier phase is delayed due to differential correction latency;
    a reference carrier phase predictor coupled to the data uplink receiver, wherein the reference carrier phase predictor calculates a predicted present reference carrier phase based in part on the past GPS reference carrier phase, wherein the predicted present reference carrier phase is not delayed due to differential correction latency; and
    a position calculator coupled to the reference carrier phase predictor and to the GPS receiver, wherein the position calculator computes a present vehicle position based in part upon the predicted present reference carrier phase and the present vehicle GPS carrier phase.

6. The device of claim 5 wherein the position calculator fits a function to multiple past GPS reference carrier phase values and evaluates the function at a present time to obtain the predicted present reference carrier phase.

7. The device of claim 6 wherein the function is a polynomial function of time.

8. The device of claim 6 wherein the function is a quadratic polynomial function of time that is a least-squares fit to the multiple past GPS reference carrier phase values.

9. The device of claim 6 wherein the function is evaluated at a time corresponding to a timetag of the present vehicle GPS carrier phase.

10. The device of claim 5 further comprising an integer cycle estimator coupled to the data uplink receiver and to the GPS receiver, wherein the integer estimator calculates an estimate of integer biases associated with the past GPS reference carrier phase and with the present vehicle GPS carrier phase, wherein the position calculator is coupled to the integer cycle estimator and computes the present vehicle position based in part upon the estimate of the integer biases.

11. The device of claim 10 wherein the integer cycle estimator incorporates code phase data and integrity beacon phase measurements into the calculation of the estimate of integer biases.

12. The device of claim 10 wherein the integer cycle estimator incorporates vehicle attitude information signals into the calculation of the estimate of integer biases.

* * * * *